(12) United States Patent
Goodzeit et al.

(10) Patent No.: US 6,908,064 B2
(45) Date of Patent: Jun. 21, 2005

(54) HIGH-EFFICIENCY REA OPTIMIZED STATIONKEEPING

(75) Inventors: Neil Evan Goodzeit, Princeton, NJ (US); Santosh Ratan, Highland Park, NJ (US); Harald Juergen Weigl, Doylestown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 6 days.

(21) Appl. No.: 10/410,893

(22) Filed: Apr. 10, 2003

(65) Prior Publication Data

US 2004/0069905 A1 Apr. 15, 2004

Related U.S. Application Data

(60) Provisional application No. 60/418,406, filed on Oct. 15, 2002.

(51) Int. Cl.[7] .................................................. B64G 1/26
(52) U.S. Cl. .......................................... 244/169; 701/13
(58) Field of Search ................................ 244/164, 165, 244/169, 172; 201/13

(56) References Cited

U.S. PATENT DOCUMENTS

| | | | | | |
|---|---|---|---|---|---|
| 5,335,179 | A | * | 8/1994 | Boka et al. | 701/13 |
| 5,517,418 | A | * | 5/1996 | Green et al. | 701/13 |
| 5,944,761 | A | * | 8/1999 | Heiberg | 701/13 |
| 6,296,207 | B1 | * | 10/2001 | Tilley et al. | 244/169 |
| 6,445,981 | B1 | * | 9/2002 | Higham et al. | 701/13 |

* cited by examiner

Primary Examiner—Galen Barefoot
(74) Attorney, Agent, or Firm—Duane Morris LLP

(57) ABSTRACT

A velocity change (ΔV) thruster is operated on a spacecraft, which unavoidably causes attitude error. A reaction wheel (RWA) corrects the attitude. At the beginning of the thruster maneuver, the total attitude control momentum required to at least correct for the ΔV thruster attitude errors over the duration of the entire maneuver is determined, and the RWA momentum may also be determined. Attitude control thrusters (REAs) are operated. The REAs are operated to correct at least the net ΔV thruster induced attitude error, and preferably also to reset the RWA to its nominal momentum. The maneuver may be stationkeeping.

8 Claims, 10 Drawing Sheets

| COAST TIME REMAINING | CURRENT VALUES | | NEW VALUES | |
|---|---|---|---|---|
| | RWA SPEED REGION | HEROS MODE | MOMENTUM ERROR PREDICTION | HEROS MODE | MOMENTUM ERROR PREDICTION |
| MANEUVER START | 0 | FIRE | OFF | COAST | ON |
| MANEUVER START | 1, 2 OR 3 | FIRE | OFF | FIRE | OFF |
| >0 | 0 | FIRE | OFF | COAST | ON |
| >0 | 3 | COAST | ON | FIRE | ON |
| >0 | 2 | FIRE | ON | COAST | ON |
| >0 | 4 | FIRE | ON | FIRE | OFF |
| ≤0 | 0, 1 OR 2 | COAST | ON | FIRE | ON |

HIGH-EFFICIENCY REA OPTIMIZED STATIONKEEPING

This application claims the priority of Provisional application No. 60/418,406 filed on Oct. 15, 2002.

FIELD OF THE INVENTION

This invention relates to spacecraft, and more particularly to spacecraft control and operation during the course of velocity change maneuvers such as stationkeeping maneuvers.

BACKGROUND OF THE INVENTION

The communications spacecraft must be maintained at, or at least near, particular orbital stations in order to provide the service for which they are designed. The spacecraft tend to deviate from their assigned stations due to gravitational effects of the sun and the moon, and also for other reasons. Stationkeeping maneuvers are used to keep the spacecraft on-station. If the spacecraft cannot be kept on station, it may lose utility and have to be replaced. Replacement spacecraft are very costly both to construct and to launch.

Stationkeeping maneuvers may be required in any direction, but one well-known type of maneuver which may be required on an approximately weekly basis is the North-South stationkeeping maneuver. Typically, the spacecraft will require operation of $\Delta V$ thrusters to provide thrust in a northerly or southerly direction. Such thrust may be provided by $\Delta V$ thrusters mounted on the nominal south face of the spacecraft. FIG. 1 illustrates the south, anti-earth, west, and east faces of a spacecraft S. In FIG. 1, the $\Delta V$ thrusters on the south face are designated 13, 14, 15, and 16. In order to make maximum use of the available stationkeeping propellant, the mass specific impulse of the south-face $\Delta V$ thrusters is maximized. This may be accomplished, for example, by the use of an electrical arc to heat the reacting propellant. Such $\Delta V$ thrusters are known as arcjets. During a north-south stationkeeping maneuver, the south-face arcjets 13, 14, 15, and 16 are typically operated continuously, with a 100% duty cycle.

Operation of the $\Delta V$ thruster(s) unavoidably results in torques on the spacecraft. These torques result when the spacecraft center of mass is not aligned with the center of pressure of the $\Delta V$ thrusters, and also due to impingement of the thruster plumes on the solar panels of the spacecraft.

In addition to stationkeeping, spacecraft require attitude control. Attitude refers to the orientation of the spacecraft body in space. Attitude control is required for reasons associated with the communication payload, and also for more mundane reasons such as the need to keep the south-face arcjets 13, 14, 15, and 16 pointed in a southerly direction. Several schemes are known for maintaining a given attitude, including the use of magnetic torquers and attitude control thrusters. Magnetic torquers may not have sufficient torque for some applications, and depend upon the earth's magnetic field, which may vary from place to place. Attitude control thrusters can be used to directly control the attitude, but the very low magnitudes of thrust which are ordinarily required are such that even small attitude control thrusters must be used at low duty cycles. When used at low duty cycles, attitude control thrusters are inefficient in their use of propellant. Inefficient use of propellant is to be avoided, as the useful life of the spacecraft depends upon how long stationkeeping and attitude control propellant lasts.

In FIG. 1, 5-pound-force (Lbf) thrusters designated 17, 18, 19, 20, 21, and 22 are illustrated as being mounted on the anti-earth face of spacecraft S. Also, 0.2 Lbf thrusters designated 1, 2, 3, and 4 are mounted at the corners of the south face, similar thrusters 5, 6, 7, and 8 are mounted at the corners of the east face, and likewise thrusters designated 9, 10, 11, and 12 are mounted at the corners of the west face.

Improved spacecraft maneuver attitude control is desired.

SUMMARY OF THE INVENTION

A spacecraft according to an aspect of the invention comprises at least one $\Delta V$ thruster for producing thrust in a particular direction. The thrust of the at least one $\Delta V$ thruster is subject to thrust errors which tend to cause disturbance torques. At least one reaction wheel counteracts the disturbance torques. At least one control thruster torques the spacecraft for thereby imparting momentum to the spacecraft. A controller is coupled to the at least one control thruster and to the reaction wheel, for (a) during a velocity change maneuver, predicting the total momentum change at the end of the velocity change maneuver attributable to the operation of the $\Delta V$ thruster, and (b) causing the at least one control thruster to operate during the velocity change maneuver to tend to null a momentum error which includes at least the predicted value of the total momentum change at the end of the velocity change maneuver which is attributable to the $\Delta V$ thruster.

A method according to an aspect of the invention is for controlling the attitude and momentum of a spacecraft during a maneuver in which operation of a $\Delta V$ thruster results in disturbance torques. The method includes the step of operating a reaction wheel to tend to maintain the attitude of the spacecraft, whereby the reaction wheel tends to change momentum during the course of the $\Delta V$ maneuver. The rate of change of the reaction wheel during some portion of the maneuver is used to project the total momentum error attributable to disturbance torques. The at least one momentum change thruster is operated in response to a momentum error signal including the projected total momentum error attributable to the $\Delta V$ thruster disturbance torque.

A variant of this method includes the step of operating the at least one momentum change thruster in a manner selected to permit the reaction wheel to compensate the torque impulse applied by the thruster so as to maintain spacecraft attitude.

A spacecraft according to an aspect of the invention includes at least one $\Delta V$ thruster for producing thrust in a particular direction. The thrust of the $\Delta V$ thruster is subject to thrust errors which tend to cause momentum changes. The spacecraft also includes at least one reaction wheel for attitude control of the spacecraft. At least one control thruster is provided for torquing the spacecraft and thereby imparting momentum thereto. A controller, during the maneuver, predicts the total momentum change at the end of the maneuver attributable the $\Delta V$ thruster, and causes the control thruster to operate during the velocity change maneuver to tend to null a momentum error which includes at least the projected momentum change at the end of the $\Delta V$ maneuver which is attributable to the $\Delta V$ thruster.

BRIEF DESCRIPTION OF THE DRAWING

FIG. 8 is a mode transition summary for a control system according to an aspect of the invention.

DESCRIPTION OF THE INVENTION

Figure 1:
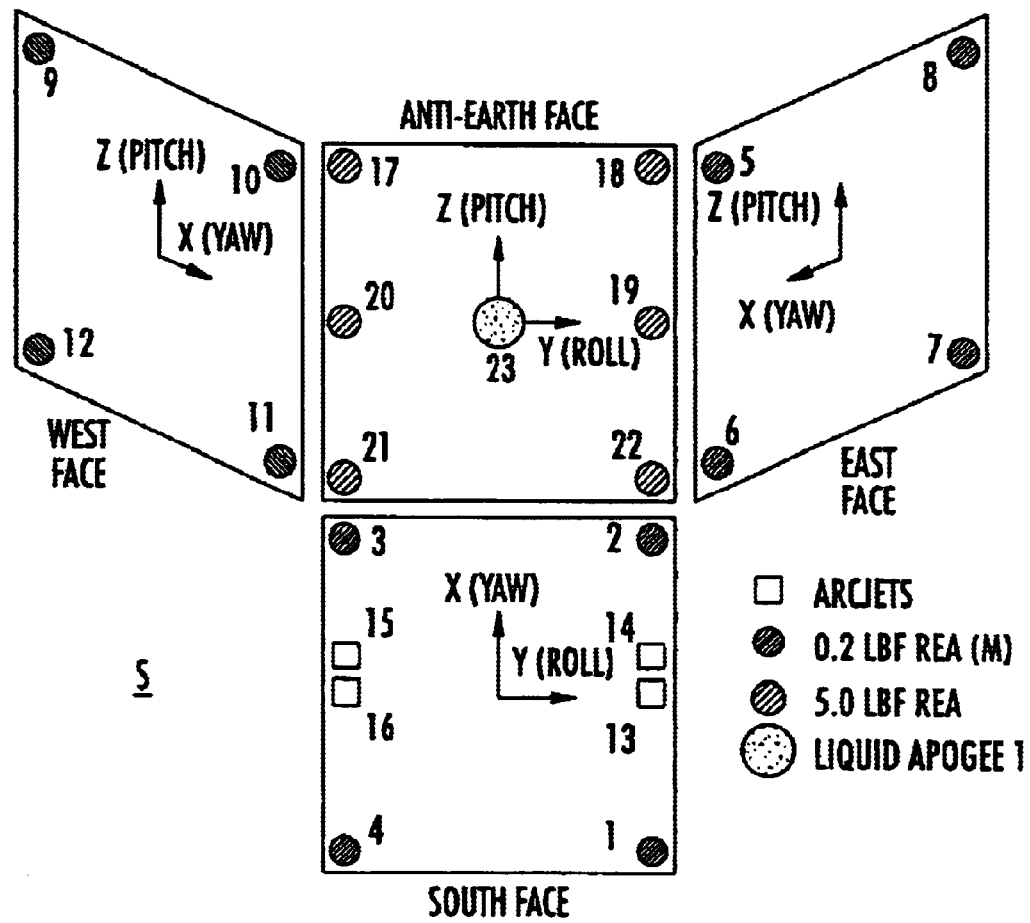
FIG. 1 is a simplified representation of the south, anti-earth, east, and west faces of a spacecraft, showing thruster locations.

A very desirable type of attitude control is the reaction or momentum wheel (reaction wheel), which achieves attitude control by changing its speed. The change in wheel speed changes its momentum, and the momentum change is coupled to the spacecraft body. A decided advantage of a reaction wheel is that it is driven by an electric motor, and electricity can be generated on-station, and thus power for running the reaction wheel is not a factor in the life of the spacecraft. A set of reaction wheels oriented along different axes, known as reaction wheel assemblies (RWAs), changes the attitude of the spacecraft by changing the rotational speeds of the various wheels. The spacecraft orbit environment is such that maintaining an attitude in which a particular face of the spacecraft is directed toward earth requires ever-increasing reaction wheel maximum speeds. Physical strength of materials and dimensional limitations of the reaction wheel establish limiting maximum rotational speeds. When a reaction wheel approaches one of its maximum speed limits, it must be "unloaded" by changing its speed, and therefore its momentum. The unloading operation transfers momentum to the spacecraft body. The momentum transfer to the spacecraft body would, if not countered, change the pointing or attitude of the spacecraft. The momentum transferred to the spacecraft body during a reaction wheel unloading operation is countered by operation of an attitude control thruster or thrusters. Thus, during reaction wheel unloading operation, the momentum change of the wheel is taken up or offset by the attitude control thrusters or reaction engine assemblies (REAs), with the spacecraft body as an intermediate element. Since the reaction wheel is unloaded over a relatively short time, the attitude control thrusters can be operated at more than a minimum duty cycle, which enhances their propellant efficiency by comparison with direct momentum control by the attitude control thrusters. By comparison with direct control of attitude by the use of attitude control thrusters without a reaction wheel, the reaction wheel scheme allows for continuous and fine momentum control, and during those times when the attitude control thrusters must be fired, the firing can be of relatively large duty cycle (around 2% to 8%), and therefore efficient in terms of propellant usage.

The operation of north- or south-face velocity change ($\Delta V$) thrusters for stationkeeping undesirably results in a disturbance torque applied around all three spacecraft axes. Such torques arise due to the placement and alignment of the $\Delta V$ thrusters, uncertainties and changes in the center-of-mass location as propellant is consumed, and impingement of the $\Delta V$ thruster exhaust plume on surfaces such as solar arrays. During the course of a $\Delta V$ maneuver, in order to maintain attitude control, the $\Delta V$ thruster disturbance torques must be counteracted by control torques applied using reaction wheels, control thrusters, or a combination of both.

In an existing spacecraft, attitude correction during a stationkeeping maneuver is provided by initially operating the attitude control thrusters to provide attitude control and concurrently to drive the reaction wheel momentum error to zero. Thereafter, the attitude control thrusters are operated to maintain the reaction wheel at near-zero momentum error. For greatest efficiency, it is desirable to operate the one or more south-face attitude control thrusters, rather than attitude control thrusters on other faces, because the thrust axes of the attitude control thrusters are in the north-south direction, and the attitude control propellant expenditure thus contributes toward the desired $\Delta V$.

Figure 2:
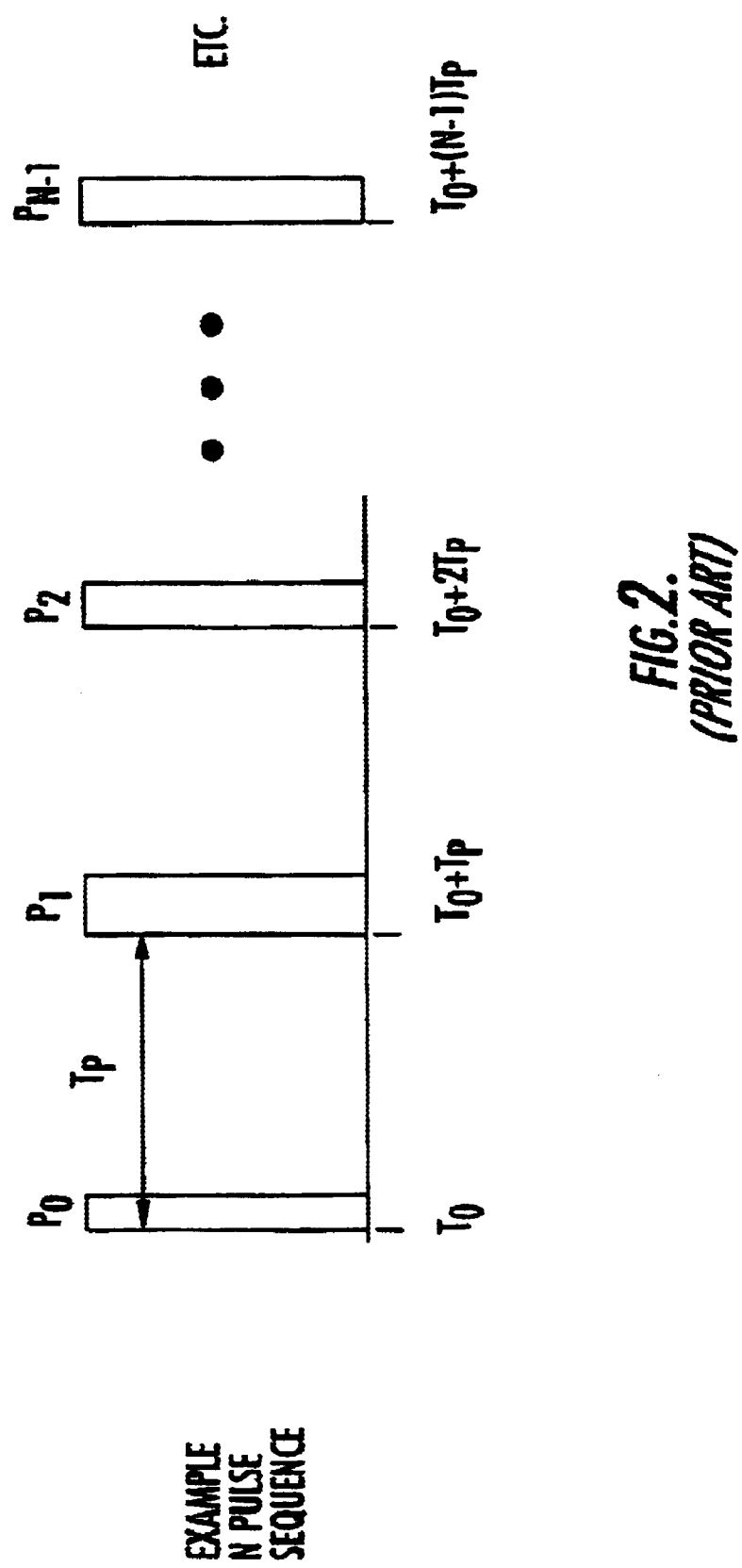
FIG. 2 is a simplified time diagram illustrating an example of a prior-art reaction engine assembly firing pulse sequence.

A problem with the operation of attitude control thrusters for counteracting $\Delta V$ thruster disturbance torques is that, because the requisite torques are small compared with the available thruster control torque, the attitude control thrusters tend to be operated with a low duty cycle, which as mentioned tends to be inefficient in terms of propellant usage. FIG. 2 illustrates a time sequence of attitude control thruster firing command pulses $P_0$, $P_1$, $P_2$, . . . , $P_{N-1}$ beginning at a time $T_0$ and recurring at time increments of $T_P$, where $T_P$ is ground-selected. In a prior-art spacecraft, $T_P$ is $\geq 0.5$ seconds, typically ten (10) seconds, is commandable in 0.5-second increments, and the minimum pulse width or duration of the firing command pulses is 15 milliseconds (msec), with a resolution of 1 msec. The duty cycle in percent=$100*P_i/T_P$. The relatively low duty cycle of 1% to 2% of the pulses illustrated in FIG. 2 results in the need for a large number of operation cycles of the attitude control thrusters. In some cases, the number of operational cycles projected to occur over the lifetime of a spacecraft may exceed the ratings of the attitude control thrusters. In a prior-art spacecraft, the yaw-roll control requirements may result in the projected need to pulse the south-face attitude control thrusters (Reaction Engine Assemblies or REAs, in this case) in excess of 450,000 cycles over a 15 year spacecraft operational life, which may necessitate adding four additional REAs on the south face to accommodate the excess cycles by distribution of the operations over two sets of REAs. The weight of the additional set of REAs and their ancillary plumbing and controls is undesirable, in that it reduces the amount of propellant which can be carried into orbit, thereby reducing the operational life of the spacecraft. In addition, the supernumerary REAs are costly to manufacture.

Figure 3:
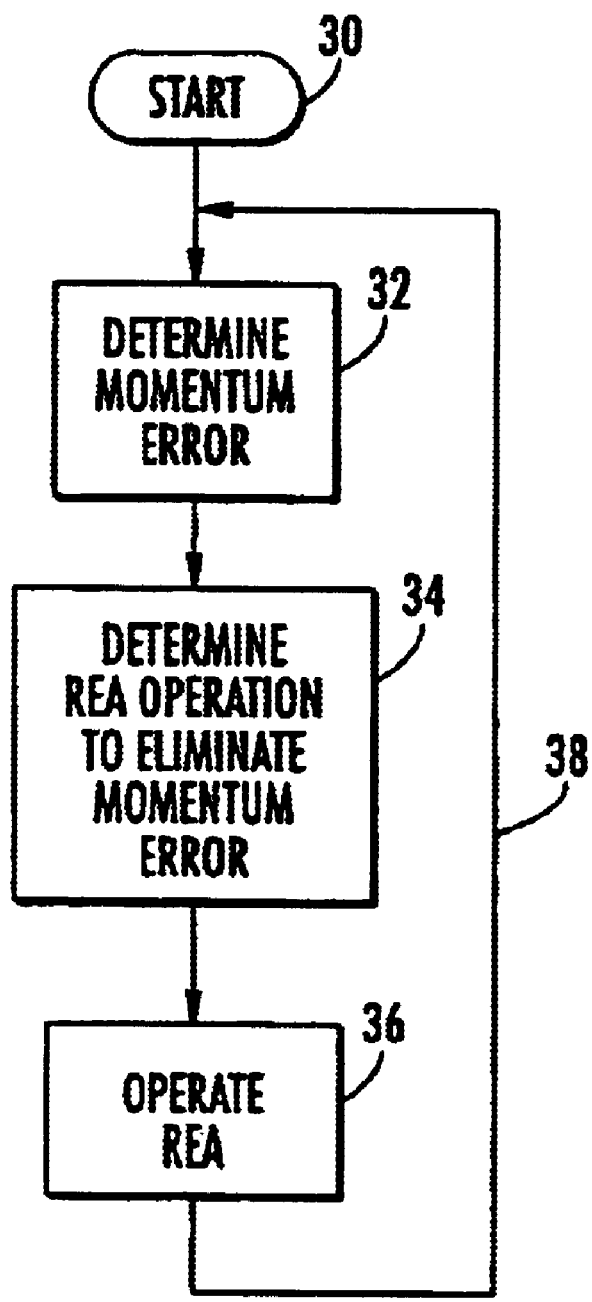
FIG. 3 is a simplified flow or logic chart or diagram illustrating the operation of a prior-art momentum control system for operation during stationkeeping maneuvers.

FIG. 3 is a simplified logic flow chart illustrating a prior-art control method for correcting spacecraft momentum during a stationkeeping (or other velocity change) maneuver when using reaction wheels for attitude control and attitude control thrusters for reaction wheel unloading. In FIG. 3, the logic begins at a START block 30 and flows to a second block 32, which represents determination of the current value of momentum error $H_{error}$ of the reaction wheels or reaction wheel assemblies. The current value of momentum error is deemed to be the current reaction wheel assembly (RWA) momentum $H_{measured}$ minus the commanded RWA momentum $H_{command}$. The commanded momentum is the desired nominal reaction wheel momentum which may be, for example, zero momentum, or some value midway between maximum and minimum values of momentum. Once the momentum error $H_{error}$ is determined, pulse-width demands for thrusters comprising the attitude control thruster set (selected from among thrusters 1 through 12 of FIG. 1) are determined in a block 34. Block 36 represents the firing of the selected attitude thruster set. The logic loops back by way of a logic path 38 to block 32 to again begin the determination of the current value of momentum error. The logic loop of FIG. 3 repeats or iterates for as long as the stationkeeping maneuver lasts.

Figure 4:
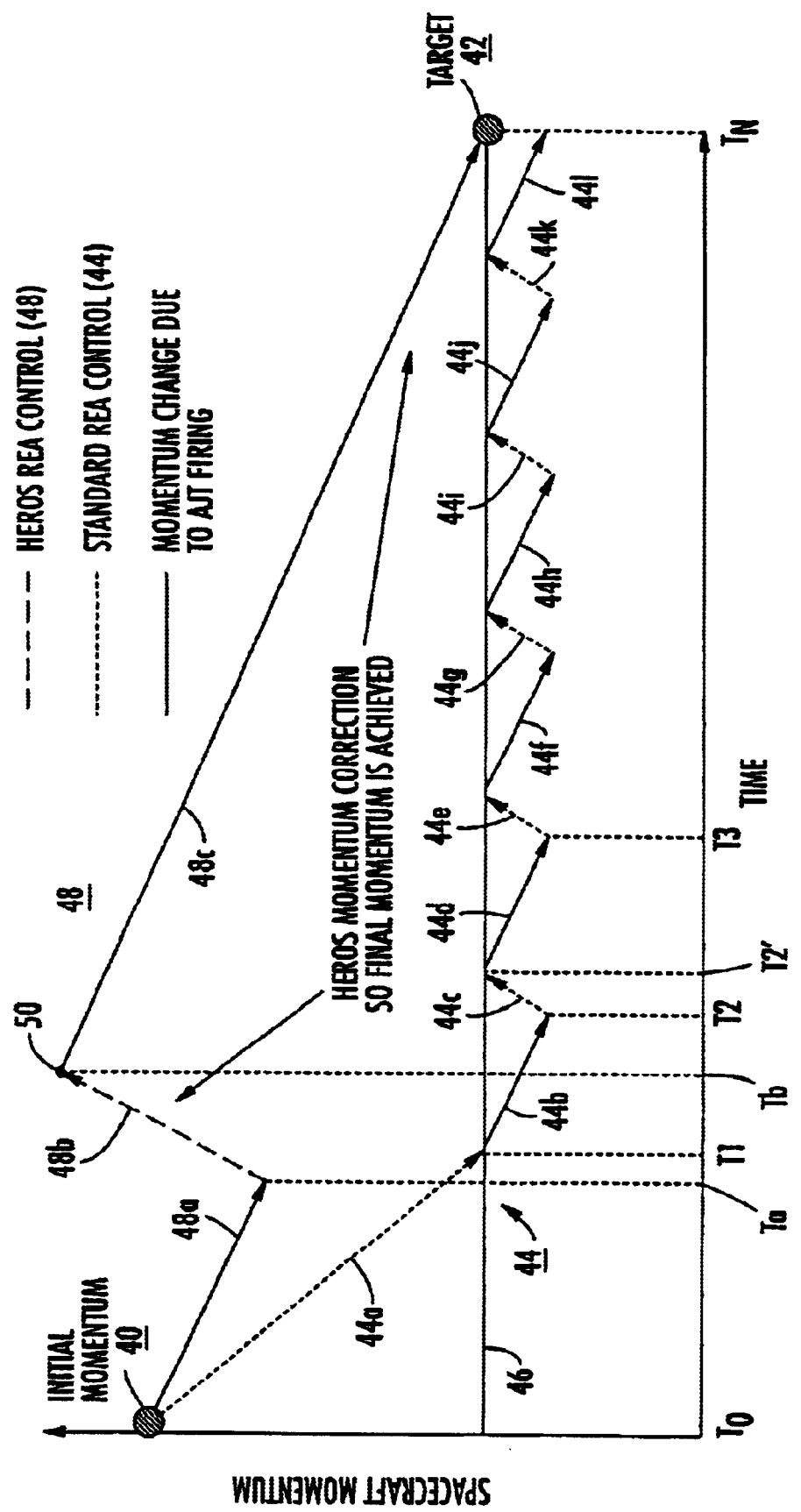
FIG. 4 is a momentum-versus-time plot showing examples of operation according to the prior art and according to an aspect of the invention.

FIG. 4 is a simplified illustration showing spacecraft momentum versus time for one possible scenario in which a stationkeeping maneuver in accordance with the prior art is compared with a stationkeeping maneuver according to an aspect of the invention. In FIG. 4, the initial total spacecraft momentum before a stationkeeping maneuver is designated by the initial momentum point 40, and the target momentum after the stationkeeping maneuver is designated as point 42. It should be remembered that the spacecraft body itself is maintained at low momentum, so the total spacecraft momentum represents for the most part reaction wheel momentum. The initial phase of the prior-art maneuver is illustrated by a dotted line portion 44a of a momentum trajectory 44. Portion 44a of the momentum trajectory represents the net momentum change occurring during the stationkeeping maneuver as the reaction engine assemblies (REAs) drive the spacecraft momentum from the initial value 40 toward a desired momentum value 46, which may be a desired momentum bias level or a zero momentum level. The momentum change represented by line 44a represents the effect of the REAs, to which the effect of the arcjet disturbance torques is summed, either aiding or resisting. The momentum change represented by dotted line 44a results in reaching the desired value 46 at a time T1. Thus, at time T1, the REA control is satisfied, and additional REA firing will not occur until there is some deviation from the desired momentum 46. From at least time T1 to time TN, the arcjets fire continuously, so their disturbance torques continuously cause or have a tendency toward deviation of the momentum away from desired value 46, thereby resulting in the momentum changes represented by lines 44b, 44d, 44f, 44h, 44j, and 44l. The REAs are pulsed in bursts during the interval T1 to TN, to thereby tend to maintain the momentum at the zero or desired level in the face of the arcjet disturbance torques; the momentum changes caused by the REA firings are represented in FIG. 4 by dotted line segments or portions 44c, 44e, 44g, 44i, and 44k of momentum trajectory 44. While only five firings of the REA are illustrated by the segments 44c, 44e, 44g, 44i, and 44k, the actual number of firings during a maneuver may be in the hundreds. Each of the attitude control thruster firings represented by momentum segments 44c, 44e, 44g, 44i, and 44k is implemented as a burst of pulses such as that illustrated in FIG. 2. During their firing bursts or firing intervals, the REAs fire in a steady-state pulsing mode, tending to maintain the desired momentum represented by the line 46 of FIG. 4.

The control method described in conjunction with FIG. 3, providing the momentum trajectory 44 in FIG. 4, has the disadvantage that it may cause attitude control thrusters to operate even though the thrust errors of the ΔV thrusters might be sufficient, without operation of the attitude control thrusters, to make the desired momentum correction, or at least to contribute toward the correction. Thus, the control arrangement of FIG. 3 will, for at least some ΔV maneuvers, operate the attitude control thrusters to accomplish a result which, were they not fired, would occur anyway. Consequently, the control arrangement of FIG. 3 will, for at least some maneuvers, use more propellant than might be necessary.

According to an aspect of the invention, momentum control is accomplished during stationkeeping by a method involving the prediction of the total momentum change expected to be produced by the ΔV thrusters during the entire stationkeeping maneuver (that is, during the interval during which the ΔV thrusters are operating to obtain the ΔV, corresponding to interval $T_0$ to $T_N$ of FIG. 4), and computing a momentum error $H_{error}$ which includes the total momentum change $H_{predict}$ which is expected or predicted to be caused by the end of the stationkeeping maneuver due to the thrust errors of the ΔV thrusters, and pulsing the reaction engine assemblies (REAs) or attitude control thrusters so as to zero or null the momentum error, while maintaining the reaction wheel assembly (RWA) speeds within their rated speeds. In a preferred embodiment of the invention, the predicted momentum change due to ΔV thruster firing over the remaining portion of the maneuver is also computed and added to the momentum error $H_{error}$.

$$H_{error} = H_{measured} - H_{command} + H_{predicted}$$

The attitude control thrusters generally fire for at least one burst during the stationkeeping maneuver (that is, during the operation of one or more of the ΔV thrusters 13 through 16 of FIG. 1 over the duration $T_0$ to $T_N$ of FIG. 4) to reduce the predicted momentum error to zero. Simulations have shown that this relatively simple control scheme can result in a saving of as much as 15% of the attitude control propellant over the lifetime of the spacecraft. Such a saving could correspond to an increase in the useful lifetime of a spacecraft of as much as six months at the current state of the art. Even a lesser increase would be very desirable.

The spacecraft momentum during an exemplary stationkeeping maneuver of FIG. 4, according to an aspect of the invention, is represented by solid line segments 48a and 48c, representing the momentum trajectory attributable to the torque errors in the ΔV thrusters, and dashed line 48b, representing the momentum correction by a controller according to an aspect of the invention. As in the case of the prior art maneuver, the arcjets are fired continuously during the maneuver, which is to say from time $T_0$ to time $T_N$, with the result that, due to their disturbance torques, the momentum deviates from the initial value 40, as suggested by solid line segment 48a. The reaction wheel assemblies (RWAs) of the spacecraft take up the momentum attributable to the firing of the arcjets, to maintain attitude. At a time, illustrated as being near time Ta, the REAs are fired, so as to bring the spacecraft momentum along dashed line 48b to a momentum value, represented as 50, from which the momentum change, attributable to or due to the disturbance torques resulting from operation of the arcjets during the expected remaining duration of the maneuver, and represented by solid line 48c, will bring the momentum to desired value 40 at end time $T_N$ of the maneuver. It will be clear from FIG. 4 that the REA momentum change (represented by dashed line 48b) required to offset the initial momentum and bring the momentum to desired value 46 is accomplished according to this aspect of the invention with less total required momentum change by comparison with the momentum change associated with the prior art procedure (represented by dotted lines 44a, 44c, 44e, 44g, 44i, and 44k). It is not even necessary to measure line lengths to verify the advantage of the invention; it is only necessary to note that the momentum change represented by dotted line 44a of the prior art is partially countered by the momentum change represented by dotted lines 44c, 44e, 44g, 44i, and 44k. Thus, the prior art maneuver (momentum trajectory 44 of FIG. 4) uses the REAs to provide momentum change first in one direction, and then in the opposite direction, while the REAs in a maneuver according to the invention provide momentum change only in one direction. It should be emphasized that the major advantage of the invention does not lie in or arise from merely reducing the number of firings of the REAs, although this may be an ancillary advantage.

From consideration of mutually parallel lines 48a and 48c of FIG. 4 and their projections (not illustrated), it will be clear that the time at which the REAs are fired, represented by dash line 48b beginning at a time near time T1, makes no difference in either the final momentum at time TN or in the duration of the firing of the REAs. Thus, control according to an aspect of the invention provides a degree of freedom involving when to start the momentum correction represented by line 48b. Ideally, the correction would take place at a time when the reaction wheel assembly has sufficient available momentum range to accommodate the momentum attributable to the momentum correction by the REAs, so as not to adversely affect the spacecraft attitude and so as not to have to break the maneuver into two (or more) parts.

If it should happen that the momentum correction provided by the REAs, illustrated as dash line 48b of FIG. 4, were of a magnitude sufficient to exceed the momentum control authority of the RWAs, the maneuver according to this aspect of the invention could be broken into multiple segments, as further described below.

There is a more subtle advantage to the method of the invention, which occurs even if the momentum errors or disturbance torques due to the arcjets happen not to be in a desired direction. This advantage is that the firing of reaction engine assembly (REA) bursts (dash line 48b of FIG. 4) occurs over a relatively short interval or portion (Ta to Tb) of the entire maneuver ($T_0$ to $T_N$), rather than being distributed over short portions (such as portion T2 to T2') of the entire maneuver as in the plot 44 associated with the prior art. As a consequence, the duty cycle of the operation of the REAs can be as great as desired during the period Ta–Tb, to the extent that considerations of engine temperature, pointing accuracy, and the like allow. Put another way, the REAs can be operated at maximum duty cycle for best propellant efficiency for as long a time as speed limitations of the reaction wheel assemblies (RWAs) do not prevent the RWAs from taking up the momentum produced by the REAs.

Figure 5:
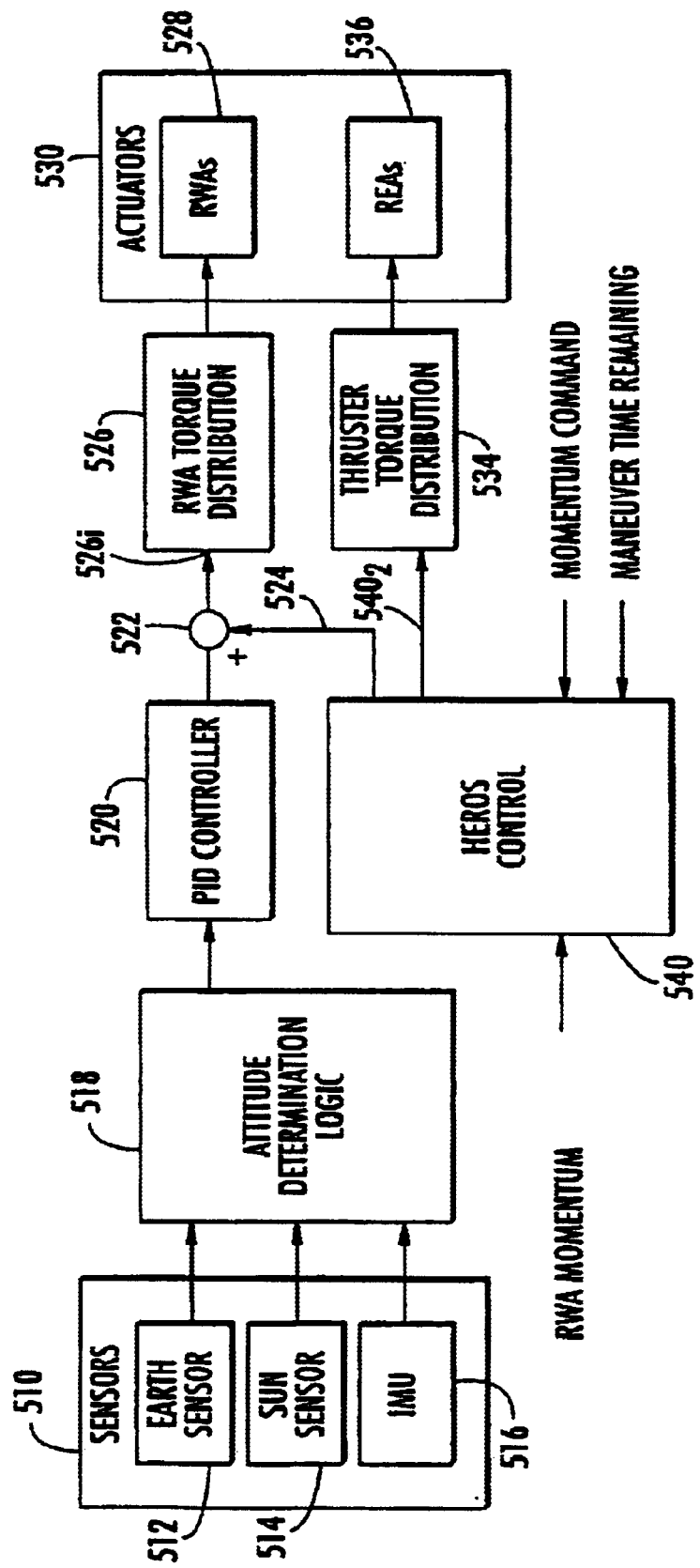
FIG. 5 is a simplified block diagram of an attitude control system according to an aspect of the invention.

FIG. 5 is a simplified block diagram of the attitude control portion of a spacecraft control system according to an aspect of the invention. In FIG. 5, an attitude sensor arrangement or suite 510 includes an earth sensor 512, a sun sensor 514, and an inertial measurement unit (IMU) 516, all of which can produce signals representing the instantaneous attitude of the spacecraft. The three-dimension attitude-representative signals are coupled from suite 510 to a known attitude determining logic block 518, which uses the sensor signals to determine the attitude of the spacecraft. The attitude information is applied to a known proportional-integral-derivative (PID) controller 520 for generating control signals representing the torque required to correct the attitude toward the desired attitude. The torque signals are applied through a summing circuit 522 to the input port 526i of a reaction wheel assembly (RWA) torque distribution logic block 526. RWA torque distribution logic 526 distributes the required three-dimensional torque among the available reaction wheels of the reaction wheel assembly 528 portion of actuator set 530, in response to which the reaction wheels (not separately illustrated) of RWA 528 are spun up or down, as appropriate to adjust momentum around their respective axes in such a fashion as to tend to cancel the spacecraft momentum (or, if a momentum or attitude change has been commanded, to drive the momentum of the spacecraft to accomplish the desired change).

In FIG. 5, a High-Efficiency REA Optimized velocity change ($\Delta V$) or Stationkeeping (HEROS) control block 540 receives RWA momentum signals, momentum command signals, and signals representing the time remaining in the stationkeeping (or other velocity change) maneuver. In general, HEROS block 540 includes momentum adjust logic and momentum adjust supervisor functions, both known per se in the prior art, but modified as described below to implement the invention. The reaction wheel assembly momentum information applied to HEROS block 540 may be in the form of simple reaction wheel speed information, which, given knowledge of the inertia of the reaction wheel, can provide the desired momentum information. HEROS block 540 produces a feedforward torque profile, which is applied by way of a path 524 to summing logic 522, for summing with the reaction wheel assembly torque commands for ultimate application to the reaction wheel assemblies 528. HEROS block 540 also produces REA torque demand information, which is applied over a path $540_2$ to a thruster torque distribution block 534. The distributed thruster torque signals are applied to the reaction engine assembly (REAs) 536 of actuator set 530 of FIG. 5.

Figure 6:
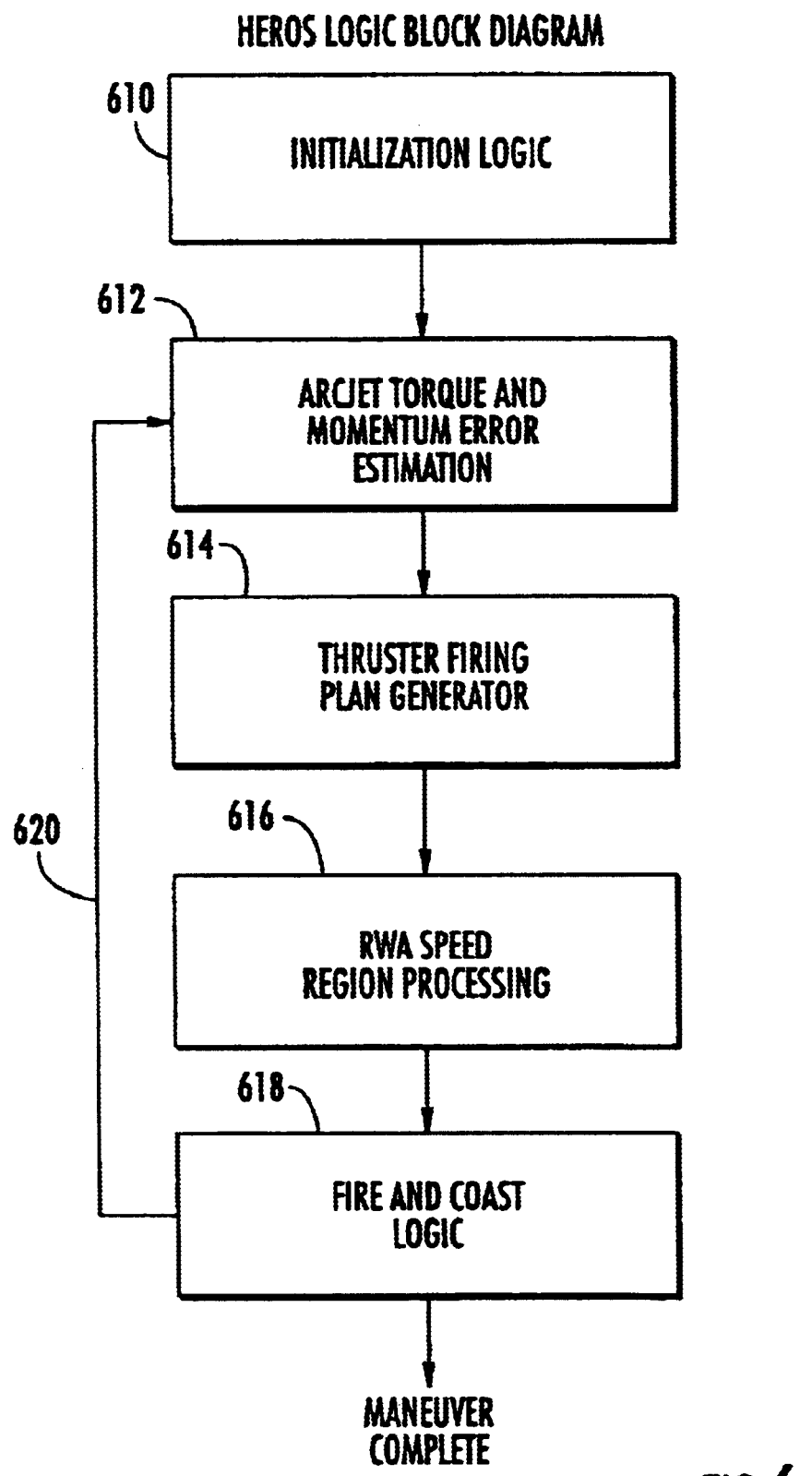
FIG. 6 is a simplified flow or logic chart illustrating the operation of a momentum control system according to an aspect of the invention.

FIG. 6 is a simplified flow or logic chart or diagram illustrating the High Efficiency REA Optimized Stationkeeping (HEROS) operation of the spacecraft in conjunction with a stationkeeping maneuver initiated from the ground. The logic of FIG. 6 may be viewed as being implemented by HEROS block 540 of FIG. 5. A stationkeeping maneuver is set up by selection of information including the duration of the stationkeeping maneuver, either in the form of arcjet firing time duration or in the form of total thrust impulse, which can readily be converted into arcjet firing time. The information may also include the reaction engine assembly (REA) pulse period $T_P$. An initialization logic, illustrated as an Initialization Logic block 610 of FIG. 6, accepts the ground information, configures the hardware and software of the spacecraft appropriately, and sets logic flags and initial values for parameters.

From block 610 of FIG. 6, with the maneuver in progress, the logic flows to an Arcjet Torque and Momentum Error Estimation block 612. Basically, block 612 estimates the velocity change thruster disturbance torques for each spacecraft body axis, and also determines the reaction wheel assembly (REA) momentum error. The disturbance torque estimation portion of the logic of block 612 executes at a 2 Hz rate in one embodiment of the invention. Generally, block 612 determines the arcjet disturbance torque by taking advantage of the reaction wheel attitude control system of the spacecraft. During the arcjet firing, the reaction wheels must take up or "absorb" the momentum attributable to the arcjet thruster firing if the spacecraft body is to remain in a controlled attitude. The rate of change of momentum in the reaction wheels required to maintain attitude is an indication of the arcjet disturbance torques. The momentum of the reaction wheels is directly related to their speed. Thus, the change of speed of the reaction wheels of the RWA over a period of time is an indication of the $\Delta V$ thruster disturbance torque over that period of time. From block 612, the logic of FIG. 6 flows to a Thruster Firing Plan block 614, which computes REA pulse widths to achieve the desired momentum adjustment. For reasons described below, block 614 also determines a reaction wheel assembly (RWA) feedforward torque demand. From block 614, the logic flows to a RWA speed region processing block 616, which assigns the various reaction wheels (not separately illustrated) to specific speed regions, depending upon wheel speed and certain control conditions. From block 616, the logic flows to a Fire/Coast logic block 618, which determines, based on inputs from block 616, whether the reaction engine assemblies should fire or the spacecraft should coast. Ideally, it should be possible to rely on the total momentum error calculated or determined during the first iteration of the logic of FIG. 6, and to simply command the applicable torque in order to achieve the desired momentum at the end of the velocity change maneuver. However, the momentum error attributable to the arcjet operation itself changes during the course of the velocity change maneuver, due to factors such as change in the arcjet plume impingement on movable structures such as the solar panels. Also, the REA control torques are uncertain. Consequently, the initial estimate, while relevant, cannot be used alone when optimal results are desired. Consequently, the logic of FIG. 6 is recurrent, operating in an iterative or feedback manner as a result of the return of the logic along a feedback path 620 to block 612.

Block 612 of FIG. 6 estimates or determines the arcjet disturbance torque. Since the body of the spacecraft is held constant by the operation of the attitude control system increasing or decreasing the momentum of the reaction wheel assembly (RWA), any arcjet disturbance torque must (when the reaction engine assembly (REA) is not firing) result in a change of momentum of the RWA. Thus, the change of RWA momentum over any given time is a direct indication of the arcjet disturbance torque over that time. Thus, the input signal to the arcjet disturbance torque estimator is simply the RWA momentum.

The estimation of the arcjet disturbance torques in block 612 of FIG. 6 is based upon the following continuous-time differential equations $$\dot{h}_w = T_{ajt} - \omega_0 \times h_w, \dot{T}_{ajt} = 0 \quad (1)$$

where $h_w$ is the 3X1 RWA momentum vector, $T_{ajt}$ is the 3X1 arcjet disturbance torque vector, $\omega_0$ is the constant 3X1 orbital rate vector, and X denotes a vector cross product.

Those skilled in the art know that the continuous time differential equations may be used to implement a discrete time estimator that provides estimates of the state vector $$x = [h_w; T_{ajt}]^T \quad (2),$$

based on RWA body momentum measurements.

Once the current arcjet disturbance torque is known, the total momentum error attributable to the arcjet disturbance torque can be projected forward in time to the known ending time of the velocity change maneuver. More specifically, using the state estimates, the RWA momentum $H_f$ at the end of the stationkeeping maneuver can also be estimated by propagating equations (1) forward in time to the known time of the end of the maneuver.

Note that the model represented by equations (1) assumes that the arcjet disturbances are constant during the maneuver. It is a simple matter to augment equation (1) with additional states such that the disturbance is assumed to change at a constant rate during the maneuver, such that $$\ddot{T}_{ajt} = 0 \quad (3)$$

At any given time during the maneuver, the momentum error expected at the end of the maneuver for this constantly-changing disturbance is given by $$H_{error} = H_c - H_f \quad (4)$$

where $H_c$ is the 3X1 vector of RWA momentum commands; and $H_f$ is the predicted RWA momentum at the end of the maneuver.

The RWA momentum commands could be constant, as for example (0,0,0), or could be based on an inertial biasing scheme so that the RWA momentum at the beginning of the next following maneuver is small. Such inertial biasing schemes are known to those skilled in the art. The output of block 612 includes the arcjet disturbance torques, which are used to predict the momentum error at the end of the maneuver. The feedback scheme including path 620 of FIG. 6 is believed to be more robust than a model using additional states but not having feedback.

The logic associated with block 612 of FIG. 6 is performed at a 2 Hz rate in one embodiment of the invention, but may be disabled (or more properly, prevented from updating) during those intervals in which the REA thrusters are fired, to avoid having the uncertainties in the thruster torque affect the arcjet torque estimation.

The predicted momentum error over the entire velocity change maneuver is calculated by block 612 of FIG. 6 as $$H_{error} = H_{measured} - H_{command} + K_{prediction}(T_{arcjet} t_{remaining}) \quad (5)$$

where:

$H_{measured}$ measured is the currently measured RWA body momentum;

$H_{command}$ is the commanded RWA momentum at the end of the maneuver;

$K_{prediction}$ is a weighting constant, which may be unity (1);

$T_{arcjet}$ is the estimated arcjet disturbance torque;

$t_{remaining}$ is the length of time remaining in the maneuver; and the product "$T_{arcjet} t_{remaining}$" is the predicted momentum change.

The length of time remaining in the maneuver may be determined by a function as simple as a timer counting down from the initially set maneuver time. A weighting value of unity provides a full prediction of the effect of the disturbance torque.

It should be noted in passing that Arcjet Torque and Momentum Error Estimator 612 of FIG. 6 also generates the prior art nonpredicted momentum error $H_{error} = H_{measured} - H_{command}$ during its calculation of the predicted momentum error, so the prior art nonpredicted control can be reverted to if desired. This can be achieved in equation 7 by setting $K_{prediction}$ to a value of zero. As described below, the non-predicted error is used instead of the predicted error during those times in which the RWA speeds are high, as at the beginning of a maneuver.

From block 612 of FIG. 6, the logic flows to a Thruster Firing Plan Generator block 614, which represents the planning of the thruster firing. The logic of block 614, and the logic of the remaining blocks 616 and 618 of FIG. 6, is performed once per thruster pulse period; this re-computation allows compensation for time-varying arcjet torques and reaction engine assembly uncertainties. More particularly, block 614 represents the computation of REA ON-time pulse widths for momentum adjustment, and RWA feedforward torque demands, to null the momentum error, while maximizing the firing duty cycle. The applied torque is limited to maintain attitude transients within predetermined bounds. Block 614 also computes the firing and nonfiring (coasting) times remaining in the maneuver.

The logic of Thruster Firing Plan Generator 614 of FIG. 6 is performed once per REA thruster pulse period, which as mentioned is nominally about ten seconds, but which may range down to 0.5 second and as high as other limitations allow. In general, Thruster Firing Plan Generator 614 of FIG. 6 computes Reaction Engine Assembly (REA) on- or firing-times to null the momentum error $H_{err}$. Such a function is known per se in the prior art. However, Thruster Firing Plan Generator 614 of FIG. 6 performs the computations for either the prior-art nonpredicted or for the predicted momentum error according to an aspect of the invention, whichever is desired, depending upon the speed of the highest-speed RWA, according to another aspect of the invention. In addition, Thruster Firing Plan Generator 614 of FIG. 6 maximizes REA torque to maximize firing duty cycles, while constraining the applied torque so as not to exceed the amount of torque that the RWAs can take up or absorb. Also, block 614 computes attitude control thruster "fire" and "coast" times and RWA feedforward torque. The RWA feedforward torque is the torque applied to the RWA "concurrently" with the REA thruster pulsing to cancel the torque impulse applied by the REA, and to effect a direct momentum transfer from the REA firing to the RWA. Put another way, the RWA feedforward is applied concurrently with the REA thruster pulsing so that the body torque impulses applied by the REAs and RWAs cancel, and is selected to minimize spacecraft attitude or pointing errors.

In general, at any given time during the velocity change maneuver, there will be a time remaining in the maneuver, and some existing momentum error to be corrected. Consequently, there is some average momentum to be corrected per unit time. Any reaction engine assembly (REA) pulse width which exceeds this amount may cause a momentum correction which is unneeded, and which may itself have to be corrected. Since the spacecraft attitude must be maintained, the pulse width determined for the REA cannot be larger than that which the reaction wheels can absorb, else the spacecraft body attitude will change. If the reaction wheel assembly happens to be already in the process of absorbing some of the arcjet torque error, it has less remaining absorbing capability, so the selected REA pulse width should not exceed the difference between the maximum reaction wheel torque capability minus the arcjet error torque. Consequently, the determination of the maximum reaction engine assembly (REA) pulse width in block 614 of FIG. 6 is that pulse width which produces a momentum adjust torque $T_{mom\text{-}adj}$ (average torque over the pulse period) which does not exceed the lesser of (a) the remaining error momentum $H_{err}$ divided by the pulse period $t_{pulse\_period}$, (b) a specified maximum torque $T_{REA\_max}$ above which unacceptable pointing errors would result, and (c) the maximum reaction wheel torque capability minus the arcjet error torque $$T_{mom\text{-}adjust} = \min\left(\frac{H_{error}}{t_{pulseperiod}}, T_{REAmax}, (T_{RWAmax} - T_{arcjet})\right) \quad (6)$$

where:

$T_{mom\text{-}adjust}$ is the momentum adjust torque;

$t_{pulseperiod}$ is the thruster pulse period;

$T_{REAmax}$ is the specified maximum allowable thruster or REA torque; and $T_{RWAmax}$ is the specified maximum allowable RWA torque. The thruster torque impulse is the REA torque multiplied by the pulse period, $I_{REA} = T_{REA} \times T_P$. The thruster pulse widths are computed using conventional prior-art means, which may be, for example, UTS logic, described in U.S. Pat. No. 5,646,847, issued Jul. 8, 1997 in the name of Ratan et al. In a particular embodiment of the invention, the minimum pulse width is 0.03 seconds and is commendable, and the logic rounds up to the minimum pulse width if the calculated pulse width is greater than half the minimum.

Block 614 of FIG. 6 also includes "fire and coast" logic, which determines whether the thrusters are to be fired, or not fired (coast). As mentioned, the invention predicts the total momentum error at the end of the velocity change maneuver, and seeks to correct that momentum error. It might happen that the momentum error attributable to the arcjet operation is such that the arcjet error torque is within the torque capability of the reaction wheel assembly (RWA), in which case the RWA can absorb the momentum error until it reaches its authority limit. In general, there are only two reasons to fire the attitude control or REA thrusters, namely (a) the reaction wheel assembly (RWA) has reached its authority limit (is approaching its specified speed limit, generally set within the maximum rated speed to provide margin) or (b) the length of time remaining in the maneuver is "short", and some momentum error remains to be corrected before the maneuver ends. That portion of the fire-and-coast logic relating to the length of time remaining in the maneuver is referred to as "termination" logic. Basically, the termination logic determines when to start firing the REAs so the momentum adjustment is completed by the end of the maneuver.

In order to determine whether there is sufficient time remaining to zero the momentum error, the logic of block 614 of FIG. 6 must know the required remaining total impulse to zero the momentum error, and the duty cycle of the thrusters. The maximum time for thruster firing $t_{fire\_remaining}$ is calculated as $$t_{fireremaining} = t_{firetotal}\left(\frac{t_{pulseperiod}}{t_{pulsewidth}}\right) \quad (7)$$

where:

$t_{fire\_remaining}$ is the burst firing time required to drive the momentum error to zero, thus completing the momentum adjust;

$t_{fire\_total}$ is the total continuous thruster firing time;

$t_{pulsewidth}$ is the thruster pulse width; and $t_{pulseperiod}$ is the thruster pulse period.

Note that $t_{pulseperiod}$ divided by $t_{pulsewidth}$ is (1/duty cycle), so the parenthetical expression in equation 7 may be viewed as a time expanding factor related to the inverse of the duty cycle.

The maximum time for thruster firing determines the allowable coast time. More particularly, the allowable coast time $t_{coast\ remaining}$ is given by $$t_{coastremaining} = t_{remaining} - (K_{fireremaining} t_{fireremaining}) \quad (8)$$

where:

$t_{remaining}$ is the time remaining in the $\Delta V$ maneuver;

$K_{fireremaining}$ is a weighting factor; and $t_{fireremaining}$ is the firing time required to achieve the desired impulse to null the momentum error. A weighting factor ($\leq 1$) provides margin to assure that the final momentum error can always be brought to the desired value, notwithstanding uncertainties in the required remaining firing times. Basically, this equation says that the remaining coast time is the remaining maneuver time minus the remaining firing time required to complete the maneuver, multiplied by a scale factor.

The maximum firing times and coast time remaining are updated continually by the logic of block 614 of FIG. 6.

When the calculated coast time is greater than zero and the RWA speeds are within the inner regions as described below, the REA thrusters do not fire and the spacecraft coasts. When the calculated coast time is less than or equal to zero, the logic switches to the firing mode.

Block 614 of FIG. 6 also calculates the reaction wheel assembly (RWA) feedforward torque to compensate for applied REA momentum adjust torque over the pulse period. The problem to which the RWA feedforward torque is directed is easy to understand. In total momentum error prediction control according to an aspect of the invention, the RWA controls the attitude of the spacecraft, and the REA thrusters are fired to "unload" or adjust the RWA momentum by applying torques to the spacecraft body. Thus, before the REA torque can unload the RWA, the momentum must "pass" through the body of the spacecraft in the form of a body momentum change, before the attitude control system perceives the change in momentum and acts to counteract that change, thereby unloading the RWA. The RWA feedforward torque commands an RWA torque concurrent with the firing of the REA, so that (ideally) the body of the spacecraft is subjected to two counteracting torques, one due to the RWA and the other due to the REA, with the result that the RWA is ideally unloaded without any momentum change of the spacecraft body. In other words, the RWAs and REAs apply equal and opposite impulse to the spacecraft, From block 614 of FIG. 6, the logic flows to a RWA speed region processing block 616. Block 616 assigns the highest speed RWA to one of five speed ranges or regions, illustrated in FIG. 7. These regions are Regions 0, in which the RWAs remain most of the time, and in which the maximum-speed RWA is below a predetermined low-speed limit;

Regions 1, which border regions 0, in which REA firing for momentum control reduces RWA speed and coasting increases RWA speed, and in which the RWA speed lies between the low-speed limit and a high-speed limit;

Regions 2, which border regions 0, in which coasting reduces RWA speed and REA firing increases RWA speed, and the RWA speed lies between the low-speed limit and the high-speed limit;

Regions 3, which border regions 1, in which REA firing reduces RWA speed and coasting increases RWA speed, and the RWA speed lies between the high-speed limit and an abort-speed limit; and Regions 4, which border regions 2, in which coasting reduces RWA speed and REA firing increases RWA speed, and the RWA speed lies between the high-speed limit and an abort-speed limit.

The maximum allowable RWA speed permitted during system operation is the abort-speed limit. As with many computer-controlled systems, the various parameters, including the speeds defining regions 0 through 4 are remotely- or ground-commandable. In one embodiment of the invention in which the maximum RWA speed is 6500 rotations per minute (RPM), the low speed limit is 4500 RPM, the high speed limit is 5000 RPM, the abort speed limit is 5500 RPM.

In order to determine the direction of speed change from the REA firing impulse, the impulse is transformed in block 616 of FIG. 6 from the body frame to the RWA frame $$\Delta H_{RWA} = -(T_{transformation} H_{err}) \qquad (9)$$

where:

$\Delta H_{RWA}$ is the change of RWA momentum;

$T_{transformation}$ is the transformation matrix from the spacecraft body frame to the RWA frame; and sign $(\Delta H_{RWA}(i))$ determines the speed change direction for the $i^{th}$ RWA.

From block 616 of FIG. 6, the logic flows to a block 618, which represents the determination of the "fire" and "coast" states of the RWAs. In other words, block 618 determines whether to fire or coast, depending upon the speed region of the highest-speed RWA. The control associated with block 618 of FIG. 6 also includes maneuver-start fire and coast logic sequences. As described in conjunction with the momentum trajectories of FIG. 4, the direction of the arcjet torque error was such as to aid in the reduction or unloading of the RWA momentum toward a desired value. In general, the torque error in three dimensions will be aiding around some axes and resisting around other axes. The logic of block 618 makes firing and coasting decisions based on the speed and region of the highest-speed RWA. In the "fire" mode, the REAs fire at the commanded pulse period, and in the "coast" mode the REAs do not fire, and the speed of the RWAs change in response to the effect of arcjet torques. In general, it is expected that the target momentum at the end of the ΔV maneuver will lie in RWA operating region 0 of FIG. 7.

The fire-and-coast operating principles of the fire-or-coast logic of block 618 of FIG. 6 can be explained with the aid of the mode transition summary of FIG. 8. Since the RWA operating speed mode is not necessarily known at the beginning of the maneuver, the HEROS error prediction is set to the OFF state, which is basically the prior-art control condition, with the REAs conditioned for firing, but not necessarily actually firing. The RWA speed region is then determined. If the speed region is determined to be range 0 of FIG. 7, the control makes a transition to the HEROS error prediction mode of operation, in the COAST mode. On the other hand, if the speed region at the start of the ΔV maneuver is determined to be 1, 2, 3, or 4, the transition is to the error-prediction-off, "FIRE" mode. In the FIRE mode of the attitude control thrusters, the wheel speed can be rapidly reduced to below the lower speed limit of FIG. 7. This completes the startup mode.

After the ΔV maneuver is past the initial start-up as described in conjunction with FIG. 8, the remaining coast time may be greater than zero, or it may be less than or equal to zero. Taking first the situation in which the remaining coast time is greater than zero, the RWA speed range of FIG. 7 may be 0, and the HEROS control mode may be FIRE with error prediction OFF. In this state, the control transitions to the COAST state with HEROS error prediction ON. If the remaining coast time is greater than zero, the RWA speed region is 3 (so that thruster firing decreases the speed of the maximum-speed RWA), and the control state is COAST with momentum error prediction ON, the control transitions to the FIRE state with momentum error prediction ON. This tends to reduce the speed of the highest-speed RWA. If remaining coast time is greater than zero, and the RWA speed region is 2, so that coasting reduces RWA speed, and the HEROS operating mode is FIRE with momentum error prediction ON, a control transition is made to COAST with momentum error prediction ON, which means that HEROS reduces the speed (the right direction) of the highest- or maximum-speed RWA in response to coasting (no propellant use for the REAs), so long as there is non-zero coasting time remaining. The RWA should not, under normal conditions, enter speed region 4, but it is anticipated that anomalies might cause such a situation. If the maximum-speed RWA should enter region 4, one possible response is to cause HEROS to abort, and revert to the prior art nonpredictive operating mode. In this case, the action which would be taken by the prior-art nonpredictive operating mode under such a condition would be to fire the thrusters to reduce the wheel speed.

Figure 7:
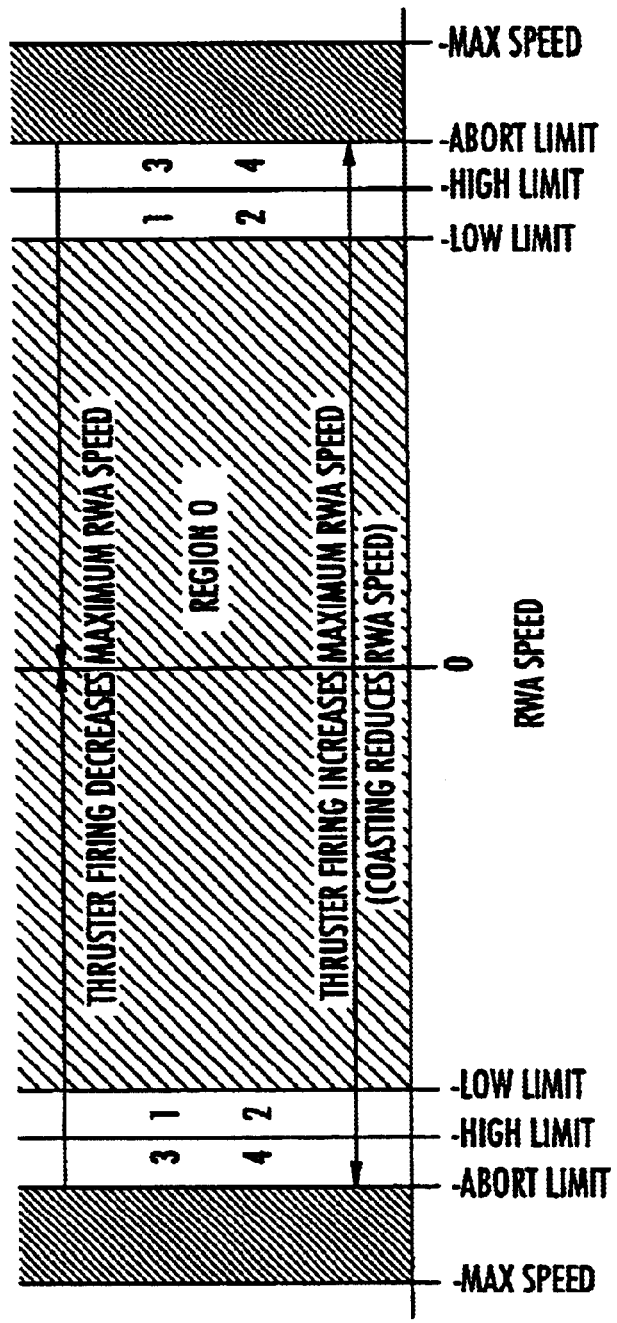
FIG. 7 is a representation of the field of all possible RWA speed regions.

In FIG. 8, if the available coast time should decrease to zero or below, and the RWA speed region is in any one of regions 0, 1, or 2 of FIG. 7, the mode transitions from COAST with momentum error prediction ON to FIRE with momentum error prediction ON, to allow the control to drive the final momentum error to zero.

As mentioned, the disturbance torques attributable to the operation of the velocity change (arcjet in the example) thrusters change as a function of time, due at least to changes in the center of mass of the spacecraft and to the impingement of the arcjet plume on the changing-position solar panels (not illustrated). Thus, the simple projection forward in time of the estimated momentum error attributable to arcjet operation may not be sufficiently accurate. According to a further aspect of the invention, the HEROS momentum error prediction control is implemented in a feedback fashion, whereby the logic iteratively calculates the total momentum error during the entire velocity change maneuver, projecting the effect of the current value of the estimated velocity change thruster disturbance torque forward in time to determine the current attitude control firing plan. This iteration is provided by the logic path 620 of FIG. 6, which returns the logic to block 612 at the REA firing recurrence interval, which is nominally 10 seconds in one embodiment of the invention.

Figure 9:
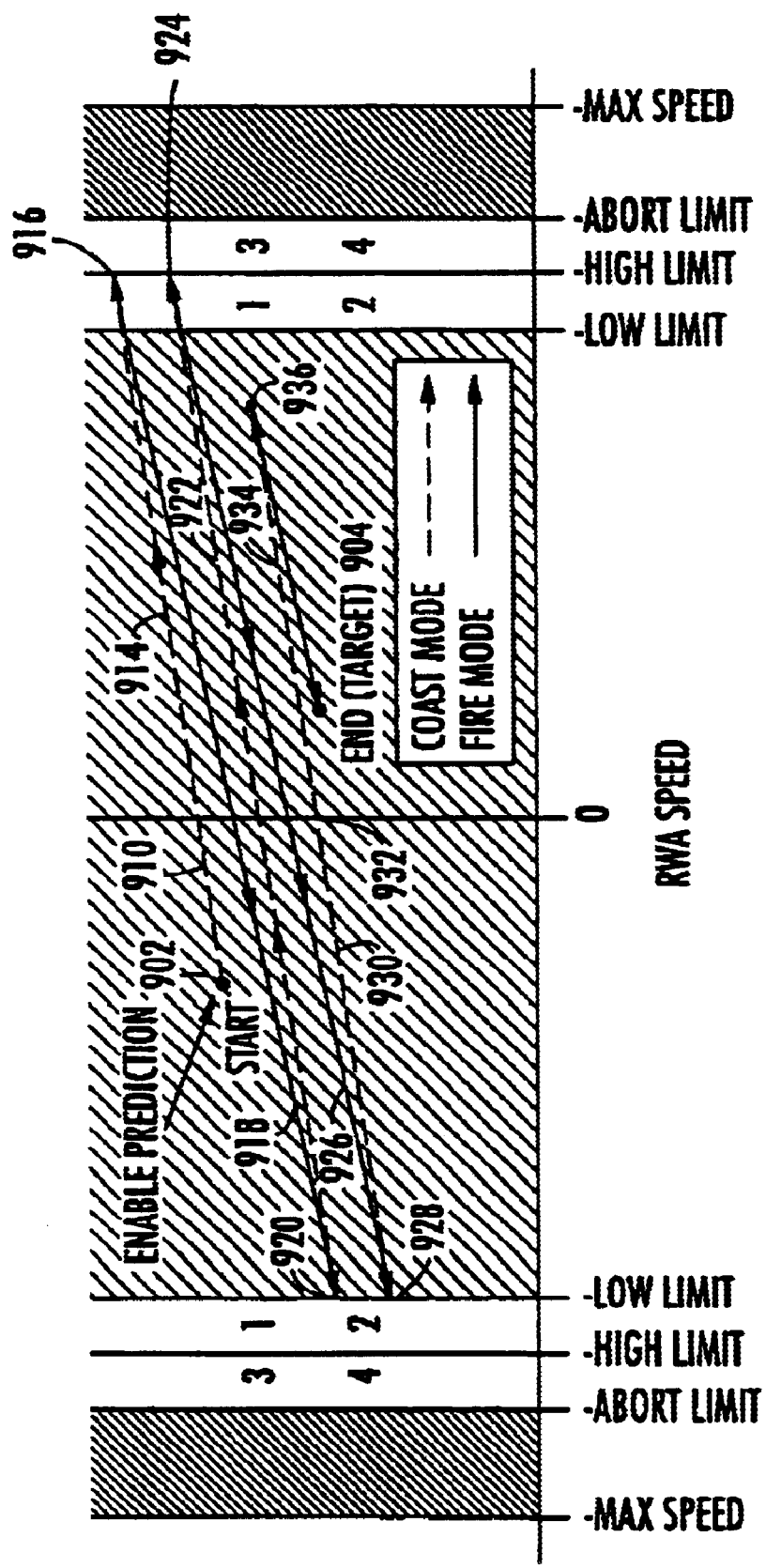
FIGS. 9 and 10 are trajectory plots on the field of FIG. 7 for certain representative operating conditions.

FIG. 9 is a representation of a first example of mode transitions on the plane of all possible speed regions for a spacecraft starting a ΔV maneuver with the RWA speeds in region 0, in which the logic alternates between COAST and FIRE modes, and coasting time remains at the beginning of the maneuver. In FIG. 9, the maneuver START state 902 is shown as being in region 0 at a "negative" (−) RWA speed, and the end or target momentum is shown as 904. From FIG. 8, it can be seen that the control system initially (immediately after START) transitions to the COAST mode with momentum error prediction ON. In the indicated region, coasting decreases the wheel speed, so the wheel speed decreases to zero along dash line, and then the wheel speed increases along dash line segment 914. The increase in wheel speed continues past the +low-speed limit and into range 1. The coasting continues while the RWA speed increases toward the +high limit. The moment that the RWA speed enters region 3 at location 916, reference to FIG. 8 indicates that the control system transitions to the FIRE mode with error prediction ON. The firing of the attitude control thrusters of the REAs immediately begins to drive the wheel speed in a negative direction, which is to the left in FIG. 9, along a trajectory identified by solid line 918. So long as the control system remains in this state, the wheel speed is driven from region 3 to region 1 to region 0, then the wheel positive wheel speed is reduced to zero speed. Continued operation in the FIRE state with momentum prediction ON then increases the wheel speed in a negative direction, until the boundary between regions 0 and 2 is reached at the negative low limit wheel speed, location 920. The moment that the wheel speed enters region 2, the control system makes a transition to the COAST mode with momentum error prediction ON. In the coasting mode, the negative wheel speed is reduced toward zero along a portion of dash-line path 922, and then begins to increase in a positive direction. At a location indicated as 924 in FIG. 9, the wheel speed again enters region 3, and, referring to FIG. 8, the control system makes a transition from the COAST mode with momentum error prediction ON to the FIRE mode with momentum error prediction ON. As described in conjunction with trajectory 918, the FIRE mode causes the positive wheel speed to decrease along solid-line trajectory 926, then increase in a negative direction until the wheel speed range enters region 2 at a location 928 of FIG. 9. When the wheel speed enters region 2, the control system again makes a transition from FIRE with momentum error prediction ON to COAST with error prediction ON, whereupon the negative wheel speed decreases toward zero along dash-line trajectory 930. Coasting continues as the wheel speed reaches zero at location 932, and further continues as the wheel speed increases in a positive direction along dash-line trajectory 934 toward a location 936. At some time, the remaining coasting time will become zero. In FIG. 9, location 936 represents the wheel speed at the time that the remaining coast time is determined to be zero. At this time, the control system makes a transition from COAST to FIRE, and the positive value of wheel speed is driven in a negative direction to the end or target momentum 904. It should be noted that in state or region diagrams such as FIG. 9, the vertical scale has little meaning, and the trajectories are staggered vertically to aid in visualizing their progress. Also, the trajectory is not for a specific RWA, but for the maximum-speed RWA at a given time.

Figure 10:
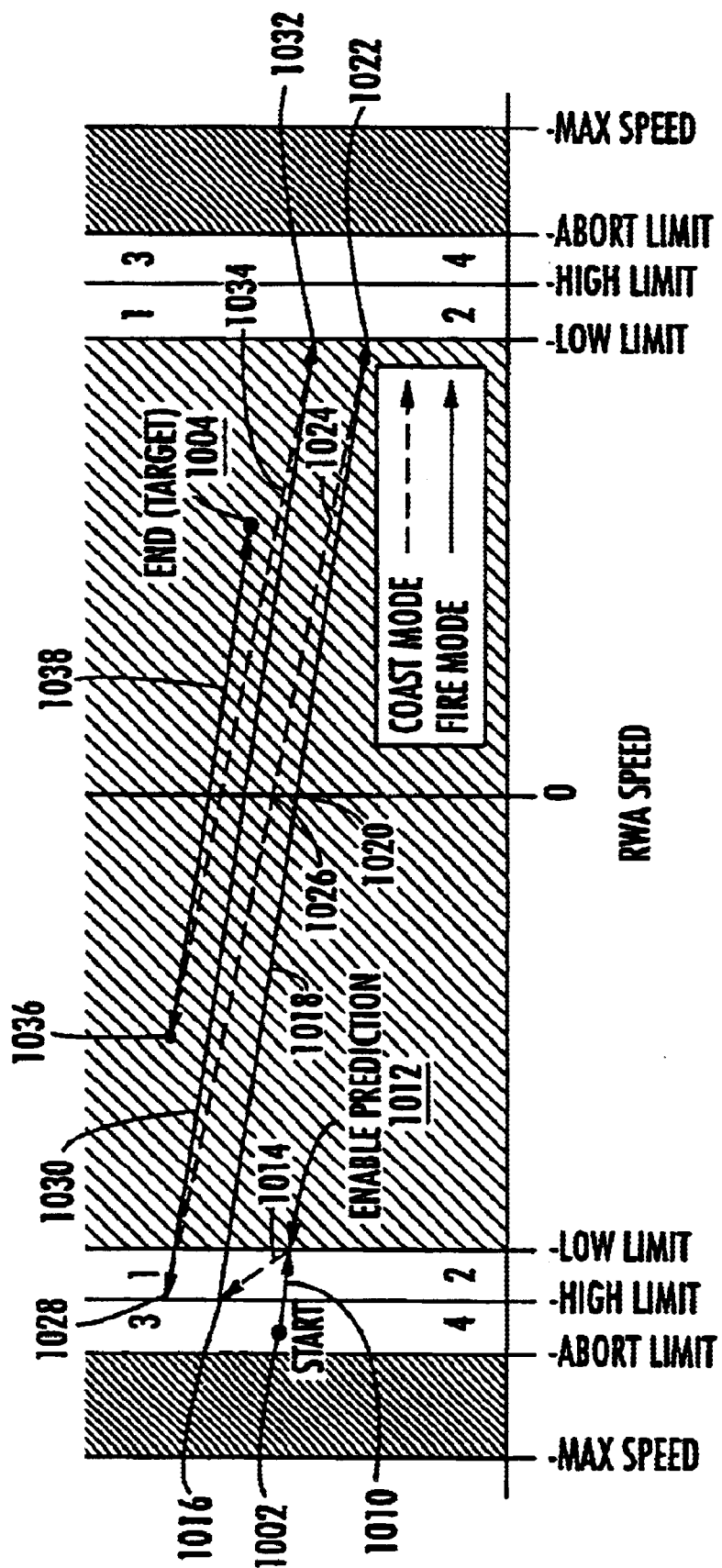

In FIG. 10, the initial wheel speed at the START location 1002 is negative and in region 3, so the control system initializes in the FIRE mode with momentum error prediction OFF, as indicated in FIG. 8, and remains in that mode. The REA firing reduces the negative wheel speed along solid-line trajectory 1010, driving the wheel speed from region 3 into region 1. The firing continues until the wheel speed enters region 0 at Enable Prediction location 1012. At this time, entry into region 0 in the FIRE mode with momentum error prediction OFF causes a transition to the COAST mode with momentum error prediction ON, In the COAST mode, the wheel speed increases along dash-line path 1014, until the wheel speed enters region 3 at location 1016. Reference to FIG. 8 indicates that being in region 3 in the COAST mode with momentum error prediction ON causes a transition into the FIRE mode with momentum error prediction ON. The FIRE state beginning at location 1016 decreases the negative wheel speed along solid line trajectory 1018. The negative wheel speed eventually reaches zero speed at a location 1020, and continued FIRE operation drives the wheel speed in a positive direction along a portion of trajectory 1018. Eventually, the increasing wheel speed of trajectory 1018 causes entry into region 2 at a location 1022. By reference to FIG. 8, being in mode 2 in the FIRE state with momentum error prediction ON results in a transition to the COAST mode with error prediction ON. In the COAST mode, the positive wheel speed decreases from location 1022 along dash-line trajectory 1024, reaching zero speed at a location 1026, and then increasing speed in a negative direction. Eventually, the increasingly negative wheel speed causes entry into region 1, but this has no effect, and coasting continues. Later, the speed enters region 3 at a location 1028. Entry into speed region 3, by reference to FIG. 8, causes a transition of the control system to the FIRE mode with momentum error prediction ON. In the FIRE mode, the wheel speed proceeds along solid-line trajectory 1030 of FIG. 10 to a location 1032. As the wheel speed enters speed region 2 at location 1032, the control system makes a transition to the COAST mode with momentum error prediction ON. In this mode, the wheel speed proceeds along a dash-line trajectory 1034 of FIG. 10 until it reaches a location designated as 1036, which represents the wheel speed at the time that a determination is made that there is no remaining coast time. At the time corresponding to location 1036 of FIG. 10, the control system makes a transition from the COAST mode to the FIRE mode, to thereby drive the wheel speed along solid-line trajectory 1038 to end or target momentum (speed) 1004.

Thus, a spacecraft (S) according to an aspect of the invention comprises at least one ΔV thruster (23) for producing thrust in a particular direction. The thrust of the at least one ΔV thruster (23) is subject to thrust errors, which tend to cause disturbance torques. At least one reaction wheel (528) counteracts the disturbance torques. At least one control thruster (22; 536) is provided for torquing the spacecraft (S) for thereby imparting momentum to the spacecraft (S). A controller (540) is coupled to the at least one control thruster (22; 536) and to the reaction wheel (528), for (a) during a velocity change maneuver, predicting the total momentum change at the end of the velocity change maneuver attributable to the operation of the ΔV thruster (23), and (b) causing the at least one control thruster (22; 536) to operate during the velocity change maneuver to tend to null a momentum error which includes at least the predicted value of the total momentum change at the end of the velocity change maneuver which is attributable to the ΔV thruster (23).

In one version, the controller (540) (a) determines the change in momentum of the reaction wheel (528) over a time interval less than the total duration of the velocity change maneuver in order to determine the current value of momentum attributable to the thrust error, and (b) projects the disturbance torque attributable to the ΔV thruster (23) (or, viewed another way, projects the current value of the momentum attributable to the thrust error) over the expected duration of the velocity change maneuver to predict the total momentum change at the end of the velocity change maneuver attributable to the ΔV thruster (23).

A method according to an aspect of the invention is for controlling the attitude and momentum of a spacecraft (S) during a maneuver in which a ΔV thruster (23) is operated, where operation of the ΔV thruster (23) is subject to disturbance torques. The method includes the step of operating a reaction wheel (528) to tend to maintain the attitude of the spacecraft (S), whereby the reaction wheel (528) tends to change momentum during the course of the ΔV maneuver. The disturbance torques are estimated based on the rate of change of the reaction wheel (528) momentum during some portion of the maneuver, for thereby determining a projected total momentum error attributable to the disturbance torques. At least one momentum change thruster (22; 536) is operated in response to a momentum error signal including the projected total momentum error attributable to the disturbance torques.

A variant of this method includes the step of operating the at least one momentum change thruster (22; 536) in a manner selected to permit the reaction wheel (528) to compensate the momentum of the ΔV thruster (23) so as to maintain spacecraft (S) attitude.

What is claimed is:

1. A spacecraft, comprising:
    at least one ΔV thruster for producing thrust in a particular direction, the thrust of said at least one ΔV thruster being subject to thrust errors which tend to cause disturbance torques:
    at least one reaction wheel for counteracting said disturbance torques;
    at least one control thruster for torquing said spacecraft for thereby imparting momentum to said spacecraft; and
    control means coupled to said at least one control thruster and to said at least one reaction wheel, for (a) during a velocity change maneuver, predicting the total momentum change at the end of said velocity change maneuver attributable to said ΔV thruster, and (b) causing said at least one control thruster to operate during said velocity change maneuver to tend to null a momentum error which includes at least the predicted value of said total momentum change at the end of said velocity change maneuver which is attributable to said ΔV thruster.

2. A method for controlling the attitude and momentum of a spacecraft during a maneuver in which a ΔV thruster is operated, where operation of said ΔV thruster produces disturbance torques, said method comprising the steps of:
    operating a reaction wheel to tend to maintain the attitude of said spacecraft, whereby said reaction wheel tends to change momentum during the course of said ΔV maneuver;
    estimating said disturbance torques based on the rate of change of said reaction wheel momentum during some portion of the maneuver, to thereby determine a projected total momentum error attributable to said disturbance torques; and
    operating at least one momentum change thruster in response to a momentum error signal including said projected total momentum error attributable to said disturbance torques.

3. A method according to claim 2, further comprising performing said step of operating said at least one momentum change thruster in a manner selected to permit said reaction wheel to compensate the torque applied by said thruster so as to maintain spacecraft attitude.

4. A spacecraft, comprising:
    at least one ΔV thruster for producing thrust in a particular direction, the thrust of said at least one ΔV thruster being subject to thrust errors which tend to cause momentum changes:
    at least one reaction wheel for attitude control of said spacecraft;
    at least one control thruster for torquing said spacecraft for thereby imparting momentum to said spacecraft; and
    control means coupled to said at least one control thruster and to said reaction wheel, for (a) during a velocity change maneuver, predicting the total momentum change at the end of said velocity change maneuver attributable to said ΔV thruster, and (b) causing said at least one control thruster to operate during said velocity change maneuver to tend to null a momentum error which includes at least said momentum change at the end of said velocity change maneuver which is attributable to said ΔV thruster.

5. A spacecraft according to claim 4, wherein said control means recurrently, during said velocity change maneuver, predicts said momentum change at the end of said velocity change maneuver attributable to said ΔV thruster.

6. A spacecraft according to claim 4, wherein said control means (a) estimates said disturbance torques based on the rate of change of said reaction wheel momentum during some portion of the maneuver, and (b) uses said disturbance torque estimate to predict said momentum change at the end of said velocity change maneuver attributable to said ΔV thruster.

7. A spacecraft according to claim 5, wherein, at a given time during the maneuver, said control means further adds to said momentum change the difference between (i) the reaction wheel momentum at the given time and (ii) a desired momentum in said reaction wheel at the end of the maneuver.

8. A spacecraft according to claim 4, wherein said control means, in conjunction with predicting the total momentum change at the end of said velocity change maneuver attributable to said ΔV thruster to form said momentum error, sums with said momentum error a further momentum error which is the difference between the current reaction wheel momentum and the desired total reaction wheel momentum at the end of said velocity change maneuver.

* * * * *